United States Patent
Shin et al.

(10) Patent No.: US 8,594,509 B2
(45) Date of Patent: Nov. 26, 2013

(54) APPARATUS AND METHOD FOR ARRANGING COMMUNICATION LINKS IN VISIBLE LIGHT COMMUNICATION

(75) Inventors: Dong-Jae Shin, Seoul (KR);
Dae-Kwang Jung, Suwon-si (KR);
Jeong-Seok Choi, Yongin-si (KR);
Hong-Seok Shin, Suwon-si (KR);
Kyung-Woo Lee, Yongin-si (KR);
Sung-Bum Park, Suwon-si (KR);
Yoo-Jeong Hyun, Seongnam-si (KR);
Seong Hoon Hyun, legal representative, Sung Nam (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1014 days.

(21) Appl. No.: 12/220,021

(22) Filed: Jul. 21, 2008

(65) Prior Publication Data
US 2009/0022496 A1    Jan. 22, 2009

(30) Foreign Application Priority Data
Jul. 19, 2007    (KR) .......................... 10-2007-0072234

(51) Int. Cl.
*H04B 10/00*    (2013.01)
(52) U.S. Cl.
USPC .......................................... 398/172; 398/118

(58) Field of Classification Search
USPC ................................................ 398/172
See application file for complete search history.

(56) References Cited

U.S. PATENT DOCUMENTS

2007/0147843 A1 *  6/2007  Fujiwara ....................... 398/118
2008/0279562 A1 * 11/2008  Naoe et al. .................... 398/140

FOREIGN PATENT DOCUMENTS

KR    10-2004-0009215 A    1/2004
KR    10-2007-0034096 A    3/2007

* cited by examiner

*Primary Examiner* — Nathan Curs
(74) *Attorney, Agent, or Firm* — Cha & Reiter, LLC.

(57) ABSTRACT

A method and apparatus for arranging communication links in visible light communication increases the user visibility of the system. The method includes the steps of: (a) synchronizing, by a visible light communication (VLC) exchange identification (XID) frame, (b) transmission timing of a primary device and a secondary device in an allocated time slot, and securing time so as to allow the primary device and the secondary device to perform an operation required for transmitting data; (c) transmitting an XID command frame from the primary to the secondary device and (d) transmitting an XID response frame from the secondary receiving the XID command frame to the primary; and (e) filling remaining space of the allocated time slot with a visibility field so as to increase visibility of the remaining space of the allocated time slot after receiving the XID command frame or the XID response frame.

14 Claims, 5 Drawing Sheets

XID command

| 1byte | 1byte | 4byte | 4byte | 1byte | 1byte | 1byte | 32byte |
|---|---|---|---|---|---|---|---|
| ADDR (C/R=1) | XID Command | Fomat Identifier | Source Device Address | Destination Device Address | Discovery Flags | Slot Number | Version Number | Discovery info (final slot only) |

XID response

| 1byte | 1byte | 1byte | 4byte | 4byte | 1byte | 1byte | 1byte | 32byte |
|---|---|---|---|---|---|---|---|---|
| ADDR (C/R=0) | XID response | Fomat Identifier | Source Device Address | Destination Device Address | Discovery Flags | Slot Number | Version Number | Discovery info |

FIG.2

APPARATUS AND METHOD FOR ARRANGING COMMUNICATION LINKS IN VISIBLE LIGHT COMMUNICATION

CLAIM OF PRIORITY

This application claims priority to an application entitled "Touch Screen" filed in the Korean Intellectual Property Office filed on Jul. 19, 2007 and assigned Serial No. 2007-72234, the contents of which are hereby incorporated by reference in its entirety.

BACKGROUND OF THE INVENTION

1. Field of the Invention

The present invention relates to a visible light communication (VLC) system. More particularly, the present invention relates to an apparatus and a method for arranging communication links respective to a wireless peripheral device using visible light communication as media.

2. Description of the Related Art

The luminous efficiency of a Light Emitting Diode (LED) has improved in recent days and the cost thereof has also dropped, thus increasing the demand for LED lighting. LED are now popular in the generalized lighting market, such as the market for fluorescent lamps, incandescent lamps, etc., as well as the specialty lighting market, such as the market for special lights used in mobile devices, a displays, vehicles, a traffic signals, and advertising boards, etc. Particularly, while the luminous efficiency of a white LED is already greater than the efficiency of an incandescent lamp, products superior even to a fluorescent lamp have also come out. Moreover, due to depletion of a Radio Frequency (RF) band frequency, confusion possibility between various wireless communication technologies, increase of demands for security, advent of a super-speed ubiquitous communications environment in 4th generation wireless technology, etc., interest in light—wireless (radio over fiber) technology complementary with an RF technology has recently increased. Therefore, research about the visible light wireless communication has progressed in various enterprises, research institutes, etc.

In a case of a portable mobile device, such as a cellular phone and a Personal Digital Assistant (PDA), and a small-sized digital product, such as a digital camera or an MPeg audio layer 3(MP3) player, present research has been focused on peripheral interfaces performing communication between devices by mounting an Infrared Data Association (IrDA) module based on infrared rays. Also, related goods have been developed and commercialized. Infrared ray wireless communication, which is distinguishable from RF communication, such as a Bluetooth or a Zigbee. etc., as infrared wireless communication operates without confusion between devices, has security, and can be implemented with low power.

As wireless communication technology has been developed, there has been suggestion to eliminate an IrDA module in a method for performing communication between devices by using a infrared LED. There is an advantage in using an LED for providing visible light in peripheral interface communication in that a user can check the communication path with his/her naked eye, in order to identify communication security. Moreover, since it is easier to know whether the user is in a proper communication path, a diffusion angle of light can be reduced in comparison with conventional infrared communication, so that high-speed communication or low power driving can be implemented.

Therefore, systems using visible light will likely remain predominant in a market for short-distance wireless communications systems for the foreseeable future.

FIG. 1 is a view illustrating a process for searching for outer infrared communication devices in a conventional infrared communication, in which the process is shown according to a sequence of time slots.

With reference to FIG. 1, a transmitting side device (primary) beginning to perform an initial infrared communication transmits a first exchange identification (XID) (A, 0) in order to check the exact number of receiving side devices (secondaries) for performing communication with the primary.

Once the number of the secondary devices receiving the transmitted frame is checked, the primary device determines numbers equal to the number of the checked secondary devices so as to allow the secondary devices receiving a first XID (A, 0) frame to perform a random selection of one of determined numbers. For example, if the number of the checked secondary devices is five, the numbers from 0 to 4 are determined, and the checked secondary devices randomly select one of the numbers from 0 to 4.

According to such a scheme, secondary devices, the number of which is "m", randomly select one among the numbers from m to 1.

Then, if an XID (n) frame (herein, n defined as a value, which is bigger than 0 and is smaller than m−1.) among the XID frames, which are transmitted from the primary device according to predetermined time slot, is transmitted to the secondary device, the secondary device selecting "n" among the numbers from m to 1 receives the XID (n) frame so as to transmit an XID response frame in nth slot time to the primary device again.

If at least two secondary devices select the same number and transmit an XID response to the primary device in the same time slot, such a scheme is repeatedly performed by generating a random number until another time slot is selected, through this scheme, it is possible to find out all corresponding secondary devices while avoiding confusion between the secondary devices, the number of which can be plural.

However, in a case of the above-described infrared communication, when a frame searching for an outer infrared communication device, i.e. a device discovery frame, is performed, the length of the device discovery frame is shorter in comparison with one allocated time slot. Therefore, when frame transmission is completed, there is a problem in that the visibility decreases until a frame of the next time slot begins. When the device discovery frame utilizing infrared communication is applied to visible light communication (VLC), there is a problem in that visibility of the communication links decreases in a device discovery procedure, so that the user can not arrange the communication links while watching visible light by his/her eye.

SUMMARY OF THE INVENTION

Accordingly, the present invention provides an apparatus and a method for arranging communication links through the configuration of a newly used frame instead of a configuring a device discovery frame in a wireless interface environment using visible light as an alternative of infrared communication.

In accordance with an exemplary aspect of the present invention, there is provided a method for arranging communication links in visible light communication, the method including the steps of: synchronizing, by a visible light communication (VLC) exchange identification (XID) frame, a transmission timing of a primary device and a secondary device in an allocated time slot, and securing time so as to allow the primary and the secondary to perform an operation required for transmitting data; transmitting an XID command frame from the primary device to the secondary device and transmitting an XID response frame from the secondary device receiving the XID command frame to the primary device; and filling a remaining space of the allocated time slot with a visibility field so as to increase visibility of the remaining space of the allocated time slot after receiving the XID command frame or the XID response frame.

In accordance with another exemplary aspect of the present invention, there is provided an apparatus for arranging communication links in visible light communication, the apparatus including: a primary device for transmitting a VLC XID command frame including a visible field to a corresponding secondary device; and at least one secondary device for transmitting a VLC XID response frame as a response to the VLC XID command frame transmitted from the primary device to the primary device.

BRIEF DESCRIPTION OF THE DRAWINGS

The above and other exemplary aspects, features and advantages of the present invention will be more apparent from the following detailed description taken in conjunction with the accompanying drawings, in which:

FIG. 2 is a view illustrating an inner configuration of a frame for searching for outer infrared communicating devices in infrared communication according to the present invention;

DETAILED DESCRIPTION

Hereinafter, some exemplary embodiments of the present invention will be described with reference to the accompanying drawings. In the following description, many particular items such as a specific component device are shown, but these are given only for providing the general understanding of the present invention, it will be understood by those skilled in the art that various modifications and changes of these items may be made within the scope of the present invention.

As previously discussed in the Background, in a conventional infrared data communication protocol, when a frame for searching for outer infrared communication devices, that is, a device discovery frame, is performed, the length of the device discovery frame is shorter in comparison with an allocated time slot so that visibility decreases. Thus, the conventional infrared data communication protocol has a problem in that a user cannot arrange communication links while watching visible light.

In the present invention, an apparatus and method for visible light communication makes use of a device discovery frame provided with a visibility field for visibility to enter a time slot, which is not used in a conventional infrared communication protocol, thereby increasing visibility so that the user can arrange communication links while watching visible light.

Figure 1:
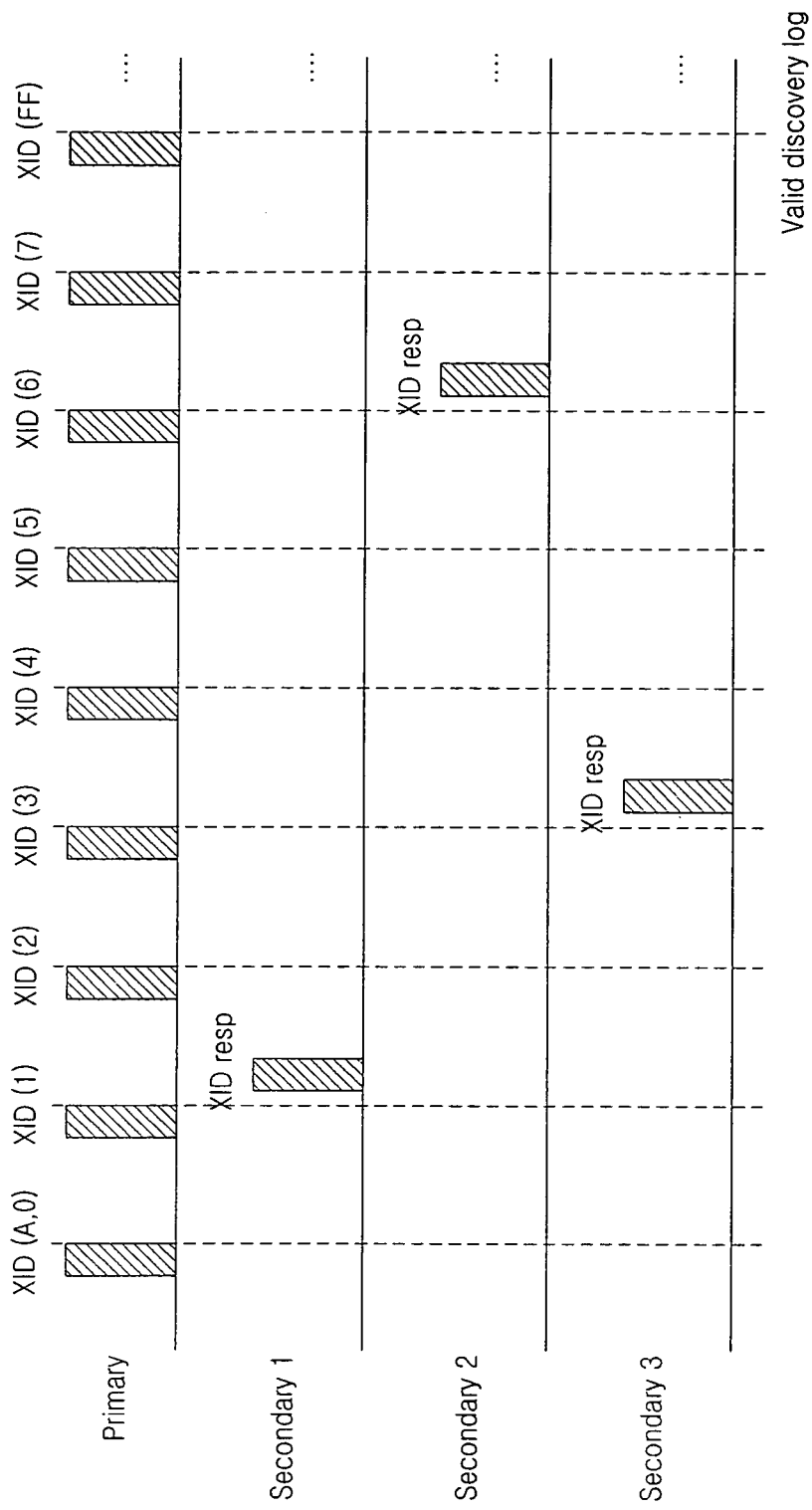
FIG. 1 is a view illustrating a procedure for searching for outer infrared communicating devices according to a sequence of time slots in conventional infrared communication.
Figure 3:
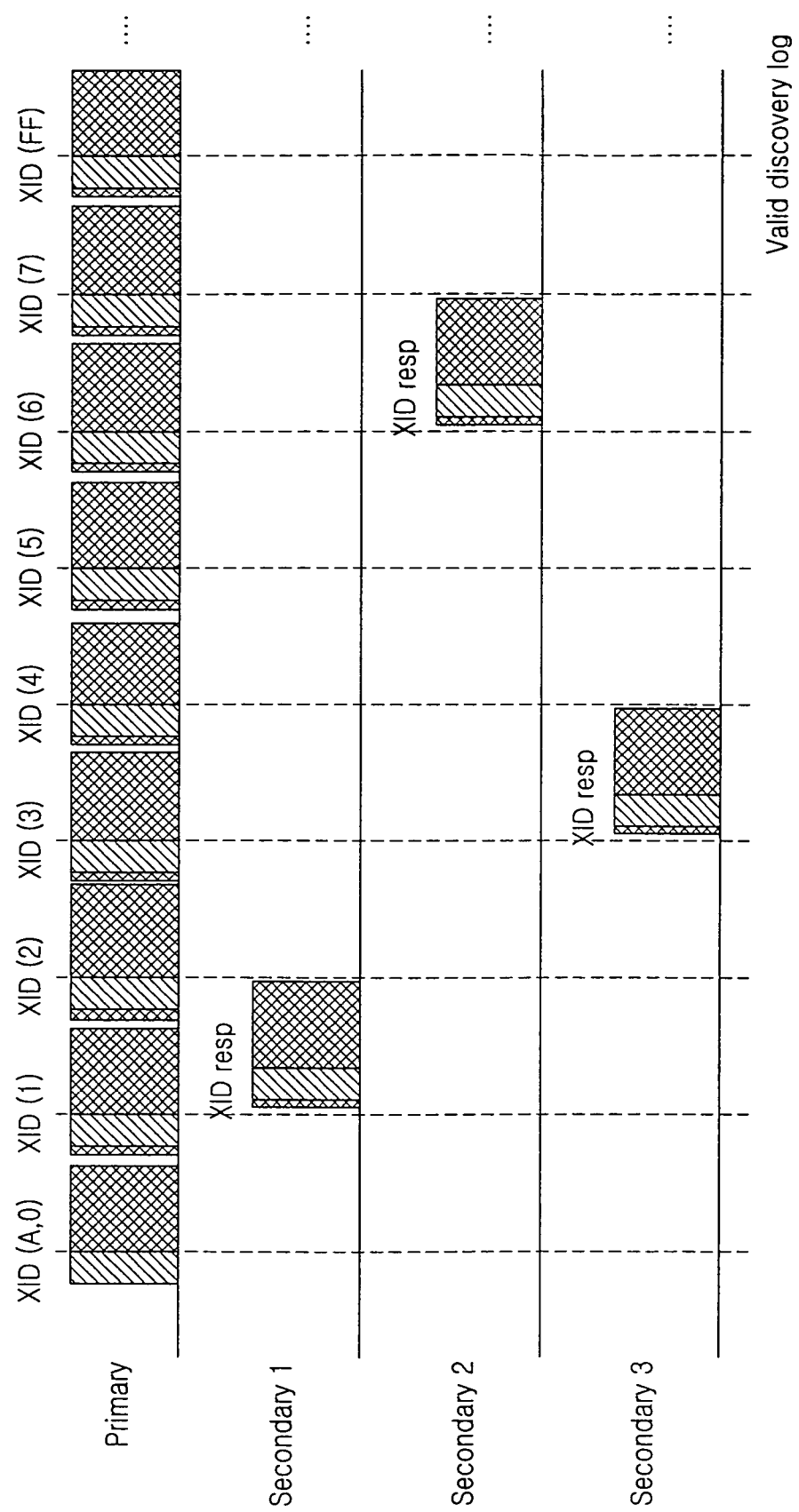
FIG. 3 is a view illustrating a procedure for searching for outer infrared communicating devices according to a sequence of time slots in visible light communication according to an exemplary embodiment of the present invention.

FIG. 3 is a view illustrating an exemplary procedure for searching for outer infrared communicating devices according to a sequence of time slots in visible light communication according to an exemplary embodiment of the present invention. According to one aspect of the present invention, a visibility field for improving visibility is added to the device discovery frame used for searching for the outer infrared communication devices previously described in FIG. 1.

With reference to FIG. 3, a transmitting side (primary) device, which starts to perform initial infrared communication, transmits a first exchange identification (XID) (A, 0) frame to devices of a receiving side (secondary) for performing communication so as to check the exact number of secondary devices.

In response to the number of secondary devices receiving the transmitted frame being checked, the primary device determines a number equal to the number of the secondary devices so as to allow the secondary devices receiving the first XID (A, 0) frame to randomly select one number from among the determined numbers. According to this scheme, the primary device allows the secondary devices receiving the XID (A, 0) frame, the number of which is m, to randomly receive one number among numbers from 0 to m−1.

Afterward, when the primary device transmits an XID (n) frame (herein, n is defined as a value which is bigger than 0 and is smaller than m−1), among XID frames transmitted according to a previously determined time slot, to the secondary devices, one of the secondary devices, which has selected n among the numbers from 0 to m−1, receives the XID (n) frame, and again transmits an XID response frame to the primary device in the nth time slot.

If at least two secondary devices select the same number and transmit an XID response frame to the primary device in the same time slot, this procedure is repeatedly performed by generating a random number until another time slot is selected. Through this scheme, it is possible to find out all corresponding secondary devices while avoiding confusion between the secondary devices, the number of which can be plural.

Herein, when a device discovery frame procedure is performed, the length of the device discovery frame is relatively short in comparison with an allocated time slot so that there is a problem in securing visibility. In order to secure visibility, the remaining space of the time slot is filled with a visibility field. Through the visibility field a user directly arranges communication links. With reference to FIG. 3, an inner configuration of the device discovery frame in visible light communication will be described below. The inner configuration according to the present invention includes the device discovery frame in visible light communication includes the visibility field disclosed by the present invention.

Firstly, the inner configuration of the device discovery frame in infrared communication is illustrated in FIG. 2.

FIG. 2 is a view illustrating an inner configuration of a frame for searching for outer infrared communicating devices in infrared communication according to the present invention. In accordance with FIG. 2, the inner configuration of a typical device discovery frame used in infrared communication is shown, and respective device discovery frames used in a primary device and a secondary device are distinguished from each other.

Firstly, the inner configuration illustrated in FIG. 2 will be schematically described. The inner configuration is constituted of an address field, a format identifier, a source address, a destination device address, a slot number, transmission of information, etc.

The primary device transmits an XID command to the secondary device, and the secondary device receiving the XID command transmits an XID response to the primary device so as to find a corresponding device, thereby performing a communication.

Based on the above described configuration, the device discovery frame procedure illustrated in FIG. 2 will be described herein below.

Comparing the inner configuration of the XID command frame with the inner configuration of the XID response frame, typically other field parts are identical except for the first two-byte file part. First, the first two-byte field part will be described. In the example shown, each frame is classified into a command frame and a response frame by command/response (C/R) bit of the address field. That is, in this particular example, if the C/R field is "1," it is classified as the primary device, and if C/R field is "0," it is classified as the secondary device. The above classified device identifies information to be sent through a format identifier, and confirms a source device address of the apparatus and a destination device address of the device.

When these addresses have been confirmed, a designation of a device discovery frame operation is performed in association with discovery flags, and the operation is confirmed if numbers of frames performing communication are equal to each other through a slot number and a version number. This confirming procedure is performed so as to avoid confusion between the secondary devices, the number of which can be numerous. When these numbers are confirmed, based on the above procedures, information of the device discovery is transmitted.

In this example, the XID command frame and the XID response frame, which include the above described components, comprise 46 bytes, respectively. The device discovery frame procedure is performed in such a manner that, if the XID command frame is transmitted from the primary device to the corresponding secondary device, the corresponding secondary device receiving the XID command frame transmits the XID response frame to the primary device.

Hereinafter, with reference to the exemplary configuration illustrated in FIG. 2, to which the present invention is applied, the inner configuration of the device discovery frame suggested in the present invention defined will be described below.

Figure 4:
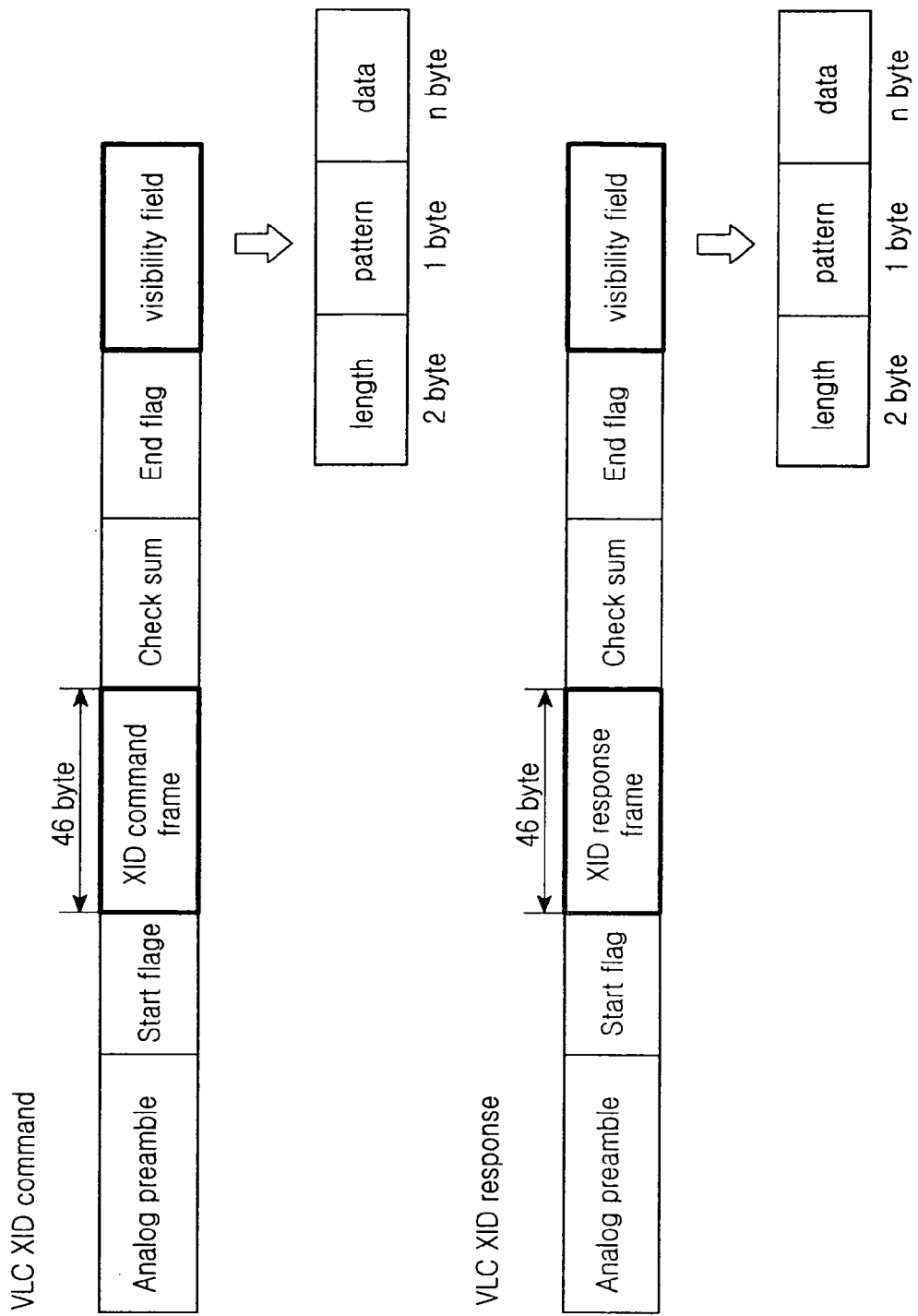
FIG. 4 is a view illustrating an inner configuration of a frame for searching for outer infrared communicating devices in visible light communication according to an exemplary embodiment of the present invention.

FIG. 4 is a view illustrating an inner configuration of a frame for searching for outer infrared communicating devices in visible light communication according to an exemplary embodiment of the present invention. As shown in FIG. 4, a visibility field is added to the configuration of the device discovery frame in infrared communication (such as illustrated in FIG. 2), and respective device discovery frames used in the primary device and the secondary device are distinguished from each other as shown in FIG. 2.

The exemplary inner configuration illustrated in FIG. 4 includes an analog Preamble, an XID command or response frame, a start flag, an end flag, a check sum, and a visibility field.

Based on the exemplary configuration illustrated in FIG. 4, the device discovery frame procedure according to the present invention will be described herein below.

Firstly, the analog preamble synchronizes transmitting timing between the secondary device and the primary device so as to secure enough time when the primary device and secondary device can perform a necessary operation in transmitting data.

Base on starting flag, the XID command frame or the XID response frame (illustrated in FIG. 2) is performed. After the data to be transmitted is checked through a check sum to confirm the data is normal, through the check sum, the data is then transmitted. When transmission of the date is ended based on the ending flag, the visibility field begins. In the visibility field, the remaining space of the time slot is filled with signals, which the user can visually recognize, so as to secure visibility until the next time slot begins.

The visibility field includes, for example, three sub-fields, i.e. a length, a pattern, and date. Each sub-field will be defined. First, the length sub-field defines the length of the visibility field. The length of the visibility bit is not defined as a specific value within the visibility field, so that visibility field may have various lengths. This length is defined as the size of two-bytes in the length sub-field.

The pattern sub-field defines the pattern of the visibility field. Also, the kind of visible light, which the user recognizes with his/her eye, isn't defined as a specific value, so that various kinds of patterns are possible. Therefore, this pattern is defined as the size of 1 byte in the pattern sub-field.

Finally, the data sub-field has a length defined in the length sub-field and a pattern defined in the pattern sub-field so as to secure visibility, and stores at least one value of the length sub-field and at least one value of the pattern sub-field, which has been prescribed above, as data. It is possible to define various values in the length sub-field and the pattern sub-field so that the size of the data subfield is changed according to the size of the defined values.

Figure 5:
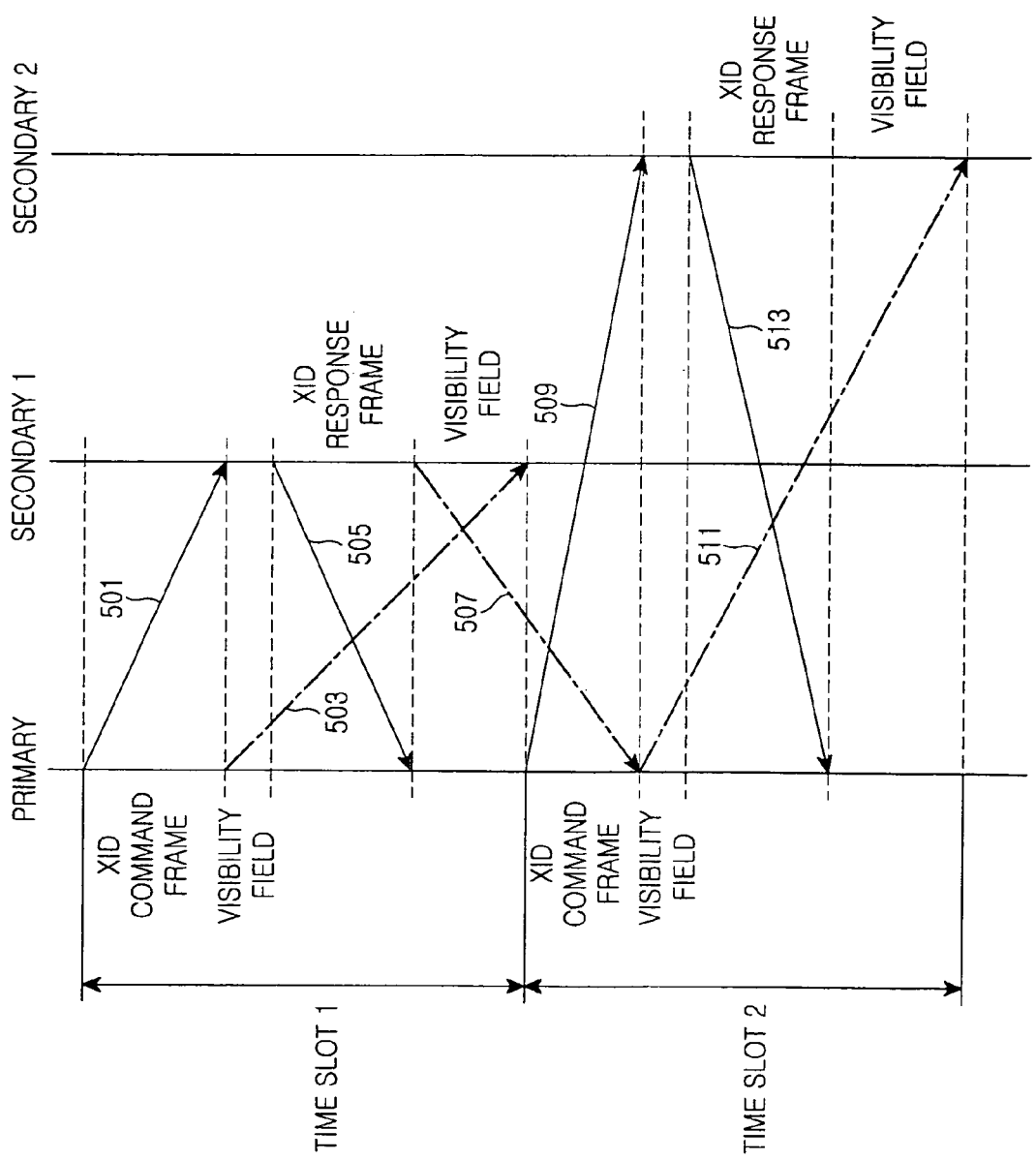
FIG. 5 is a flow chart of a procedure for searching for outer infrared communicating devices in visible light communication according to an exemplary embodiment of the present invention.

FIG. 5 is a flow chart of an exemplary procedure for searching for outer infrared communicating devices in visible light communication according to an exemplary embodiment of the present invention. In FIG. 5, a flow of the device discovery procedure is illustrated based on an XID command frame, a response frame, and a visibility frame according to one exemplary embodiment wherein one primary and two secondaries are combined based on each time slot.

Referring now to FIG. 5, initially, an XID command frame is transmitted from the primary to a "secondary 1" in step 501, and the remaining space of the time slot is filled with a visibility field according to the present invention in step 503 so as to secure visibility. In step 505, an XID response frame corresponding to the XID command frame is transmitted from the secondary 1 to the primary. The secondary 1 transmitting the XID response frame to the primary has the remaining space filled with a visibility field so as to secure visibility. This is shown in step 507.

When a device discovery procedure respective to the primary and the secondary 1 is completed, a procedure respective to the primary and a "secondary 2" is performed, and the flow of the procedure is the same as the above described flow respective to the secondary 1.

While step 507 is performed, an XID command frame is transmitted from the primary to the secondary 2 in step 509, and a visibility field is filled in the remaining space of the time slot in step 511. In step 513, an XID response frame corresponding to the XID command frame is transmitted from the secondary 2 to the primary.

As shown in FIG. 5, each visibility field 503, 507, and 511 is filled with the empty space of each time slot so that visibility increases. Therefore, the user can arrange communication links while watching visible light.

In order to maximize the visibility of the above-described visibility field, each subfield can be configured by using a DC-unbalanced pattern. The DC-unbalanced pattern is a typical pattern allowing the user to easily recognize visibility in such a manner that a digital signal wherein numbers of 1s and 0s are composed in a balanced state and changed so as to form an unbalance state thereof.

As described above, according to an exemplary embodiment of the present invention, configuration and operation of an apparatus and a method for arrange communication links in visible light communication can be achieved. While the invention has been shown and described with reference to certain preferred exemplary embodiments thereof, it will be understood by those skilled in the art that various changes in form and details may be made therein without departing from the spirit and scope of the invention as defined by the appended claims.

As described above, according to the present invention, most of the space of a time slot is filled by using a device discovery frame having improved visibility in a visible light communication protocol including the characteristic of visible light. Therefore, visibility is improved so that the user can arrange communication links while watching visible light.

What is claimed is:

1. A method for arranging communication links in visible light communication, the method comprising:
    synchronizing, by a visible light communication (VLC) exchange identification (XID) frame, a transmission timing of a primary device and a secondary device in an allocated time slot, and a securing time so as to allow the primary device and the secondary device to perform an operation required for transmitting data;
    transmitting an XID command frame from the primary device to the secondary device and transmitting an XID response frame from the secondary device receiving the XID command frame to the primary device; and
    filling remaining space of the allocated time slot with a visibility field to increase visibility of the remaining space of the allocated time slot after receiving the XID command frame or the XID response frame, wherein the visibility field comprises a plurality of sub-fields, which include a length sub-field, a pattern sub-field, and a data sub-field wherein the length sub-field defines a length of a visibility field, as a length value of a maximum of two bytes, and includes transmitting the defined value to the data sub-field.

2. The method as claimed in claim 1, wherein the visibility field is arranged at a trailing portion of the XID command frame or the response frame in configuration of the VLC XID frame for increasing visibility of the remaining space of the allocated time slot.

3. The method as claimed in claim 1, wherein the length sub-field defines a length of at least one visible bit.

4. The method as claimed in claim 1, wherein a quantity of visible bits in the visibility field is varied.

5. The method as claimed in claim 1, wherein the pattern sub-field defines a length of at least one pattern bit, as a length value of a maximum of one byte, and transmitting the defined value to the data sub-field.

6. The method as claimed in claim 1, the pattern sub-field comprises a plurality of pattern bits.

7. The method as claimed in claim 1, wherein the data sub-field stores each defined value of the length sub-field and the pattern sub-field within the visibility field as data.

8. The method as claimed in claim 1 wherein predetermined values are defined in the length sub-field and the pattern sub-field so that a size of the data sub-field is changed according to the defined values.

9. A system for arranging communication links in visible light communication (VLC), the system comprising:
    a primary device for transmitting a VLC XID command frame including a visibility field to a corresponding secondary device, wherein the visibility field comprises a plurality of sub-fields, which include a length sub-field, a pattern sub-field, and a data sub-field wherein the length sub-field defines a length of a visibility field, and comprises no more than two bytes in length, and the pattern sub-field comprises no more than 1 byte in length; and
    at least one secondary device for transmitting a VLC XID response frame including the visibility field as a response to the VLC XID command frame transmitted from the primary device to the secondary device.

10. The system according to claim 9, wherein each sub-field being configured by a DC-unbalanced pattern.

11. The system according to claim 9, wherein the visibility field of each of the primary device and the secondary device include sub-fields.

12. The system according to claim 11, wherein said at least one secondary device comprises a plurality of secondary devices.

13. The system according to claim 12, wherein the visibility field of each of the plurality of secondary devices includes respective distinguishing sub-fields.

14. An apparatus for arranging communication links in visible light communication (VLC), the apparatus comprising:
    a primary device for transmitting a VLC XID command frame including a visibility field to a corresponding secondary device, and for receiving a VLC XID response frame as a response to the VLC XID command frame transmitted from the secondary device to the primary device, wherein the visibility field comprises a plurality of sub-fields, which include a length sub-field, a pattern sub-field, and a data sub-field wherein the length sub-field defines a length of a visibility field, as a length value of a maximum of two bytes, and the defined value is transmitted to the data sub-field.

* * * * *